Figure 1:
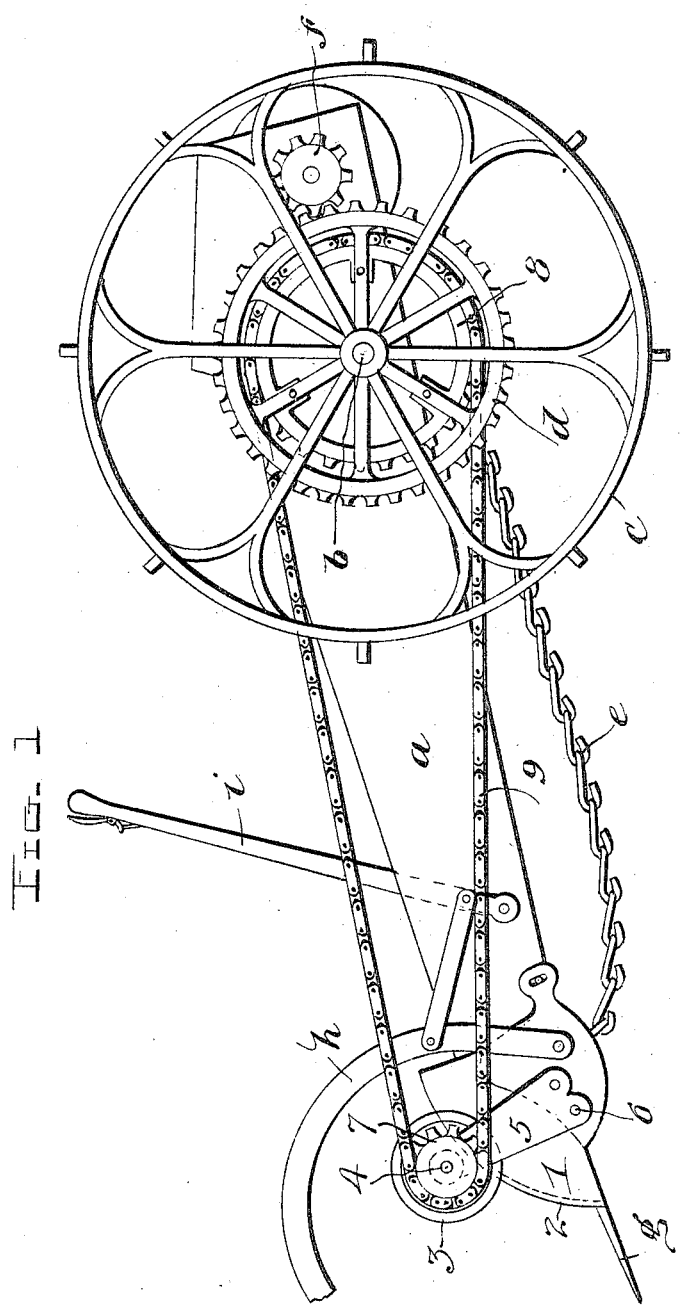

No. 812,673. PATENTED FEB. 13, 1906.
T. N. OIUM.
POTATO DIGGER.
APPLICATION FILED JUNE 29, 1905.

2 SHEETS—SHEET 1.

Witnesses
J. A. Griesbauer, Jr.
C. H. Griesbauer.

Inventor
Thomas N. Oium
by H. B. Willson
Attorney

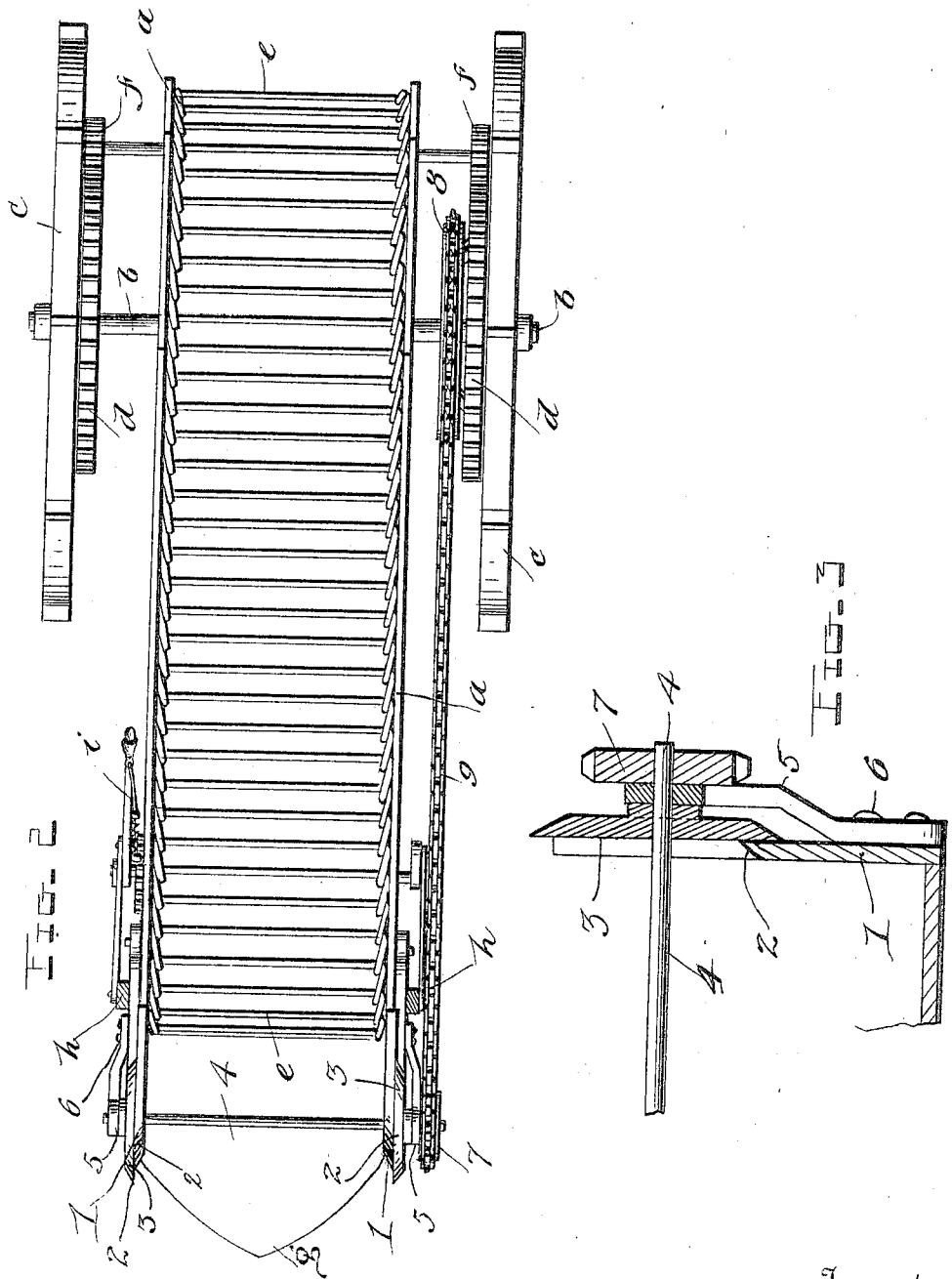

UNITED STATES PATENT OFFICE.

THOMAS N. OIUM, OF LISBON, NORTH DAKOTA.

POTATO-DIGGER.

No. 812,673.  Specification of Letters Patent.  Patented Feb. 13, 1906.

Application filed June 29, 1905. Serial No. 267,638.

*To all whom it may concern:*

Be it known that I, THOMAS N. OIUM, a citizen of the United States, residing at Lisbon, in the county of Ransom and State of North Dakota, have invented certain new and useful Improvements in Potato-Diggers; and I do declare the following to be a full, clear, and exact description of the invention, such as will enable others skilled in the art to which it appertains to make and use the same.

My invention relates to improvements in potato-digging machines, particularly with reference to cutting the vines, weeds, and the like at the sides of the shovel or plow to prevent them from being caught by and entangling the elevator and gearing and choking the machine, and my invention consists in the construction and combination of devices hereinafter described and claimed.

In the accompanying drawings, Figure 1 is a side elevation of a portion of a potato-digging machine embodying my improvements. Fig. 2 is a top plan view of the same, and Fig. 3 is a detail transverse sectional view.

For the purposes of this specification I herein show my improvements applied to the form of potato-digging machine known as the "Dowden" digger. It will be understood, however, that my improvements may be used with other machines of this class, and I do not desire to limit myself in this particular.

The main frame is indicated at $a$, the driving-axle at $b$, the rear supporting-wheels at $c$, the driving-gears at $d$, the endless conveyer at $e$, and the gears on the rear shaft thereof and which mesh with the driving-gears $d$ are indicated at $f$. The plow or shovel $g$, pivotally mounted at the front end of the frame $a$, is connected to the rear ends of the beams $h$, the front ends of which are connected to a front supporting-frame, which is not here shown, as it forms no part of my present improvements. The lever for adjusting the plow or shovel is indicated at $i$.

In the embodiment of my invention I provide upon each side of the shovel or plow a combined guard and cutter plate 1, each having a curved front upper cutting edge 2. They are further provided with lateral flanges that extend under and are bolted to the plow. These guards and cutter-plates are more particularly described and claimed in my copending application for Letters Patent of the United States, filed January 7, 1905, Serial No. 240,063, allowed March 6, 1905. They may, however, be of any suitable construction. These guard and cutter plates not only guide and retain the potatoes upon the shovel or plow, but also cut the vines, weeds, or other vegetable growth through which the machine passes. I combine with these fixed guard and cutter plates 1 revolving colters 3, which are disposed against the outer sides thereof and are carried and revolved by a shaft 4, that has its bearings in a pair of brackets 5, said brackets being bolted at their lower ends to the sides of the plow or shovel, as at 6. On one end of said shaft is a sprocket-wheel 7. To one of the driving-gears $d$ I secure a sprocket-wheel 8, which operates an endless sprocket-chain 9, that engages the sprocket-wheel 7, and hence causes the colters to be revolved when the machine is in operation. The cutting edges of the revolving colters, which may be either serrated or plain, coact with the cutting edges of the guard and cutting plates 1 in cutting the vines, weeds, and other vegetation and greatly increase the efficiency of the machine.

Having thus described my invention, what I claim is—

1. A potato-digging-machine plow, having guard and cutter plates on opposite sides thereof, revolving colters coacting with said guard and cutter plates, and means to revolve the colters.

2. In combination with the plow of a potato-digging machine, fixed guard and cutter plates at the sides thereof, brackets secured to the sides of the plow, a shaft having its bearings in said brackets, colters on said shaft, coacting with the fixed guard and cutter plates, and means to revolve said shaft and colters.

3. In combination with a potato-digging-machine plow, guard and cutting plates on opposite sides thereof, each provided with a sharpened front cutting edge extending upwardly from the plow and with a lateral flange extending under and bolted to the plow, brackets secured to the sides of the plow and extending above the guard and cutting plates, and revolving colters, coacting with the guard and cutting plates and mounted on said brackets.

In testimony whereof I have hereunto set my hand in presence of two subscribing witnesses.

THOMAS N. OIUM.

Witnesses:
 ANDREW SANDUGER,
 R. S. MILLER.